(12) United States Patent
Solimano

(10) Patent No.: US 8,561,009 B2
(45) Date of Patent: Oct. 15, 2013

(54) METHOD AND APPARATUS FOR CONTROLLING THE CLOSING OF A PLANT APPLICATION

(75) Inventor: Marco Solimano, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 832 days.

(21) Appl. No.: 12/334,564

(22) Filed: Dec. 15, 2008

(65) Prior Publication Data

US 2009/0157208 A1  Jun. 18, 2009

(30) Foreign Application Priority Data

Dec. 13, 2007  (EP) .................................... 07024191

(51) Int. Cl.
G05B 19/418 (2006.01)
G06N 5/02 (2006.01)

(52) U.S. Cl.
USPC ................................ 717/100; 700/96; 706/47

(58) Field of Classification Search
USPC ............... 700/96; 706/47; 717/100, 104, 105
See application file for complete search history.

(56) References Cited

U.S. PATENT DOCUMENTS

| | | | |
|---|---|---|---|
| 2003/0009250 A1* | 1/2003 | Resnick et al. | 700/94 |
| 2004/0040024 A1* | 2/2004 | Green et al. | 718/100 |
| 2005/0010931 A1* | 1/2005 | Langkafel et al. | 719/328 |
| 2005/0044532 A1* | 2/2005 | Pfander et al. | 717/124 |
| 2005/0187649 A1* | 8/2005 | Funk et al. | 700/121 |

* cited by examiner

*Primary Examiner* — Chat Do
*Assistant Examiner* — Lynda Dinh
(74) *Attorney, Agent, or Firm* — Laurence A. Greenberg; Werner H. Stemer; Ralph E. Locher

(57) ABSTRACT

A method and system control for closing a plant application running on a manufacturing execution system (MES) application. The method includes the steps of providing to a set of classes, a custom shutdown rule to be customized at engineering time; defining, for certain classes belonging to the set of classis, certain shutdown rules with a set of actions to be performed by the MES application; notifying the closing request to the MES application; invoking the shutdown rules once for each object of the classes which have a defined shutdown rule; performing the actions defined in the invoked custom shutdown rules; by the MES application, closing or not closing the plant application according to the results of the invoked shutdown rules; by the MES application, notifying the PM launcher whether the plant application was closed or not.

3 Claims, 1 Drawing Sheet

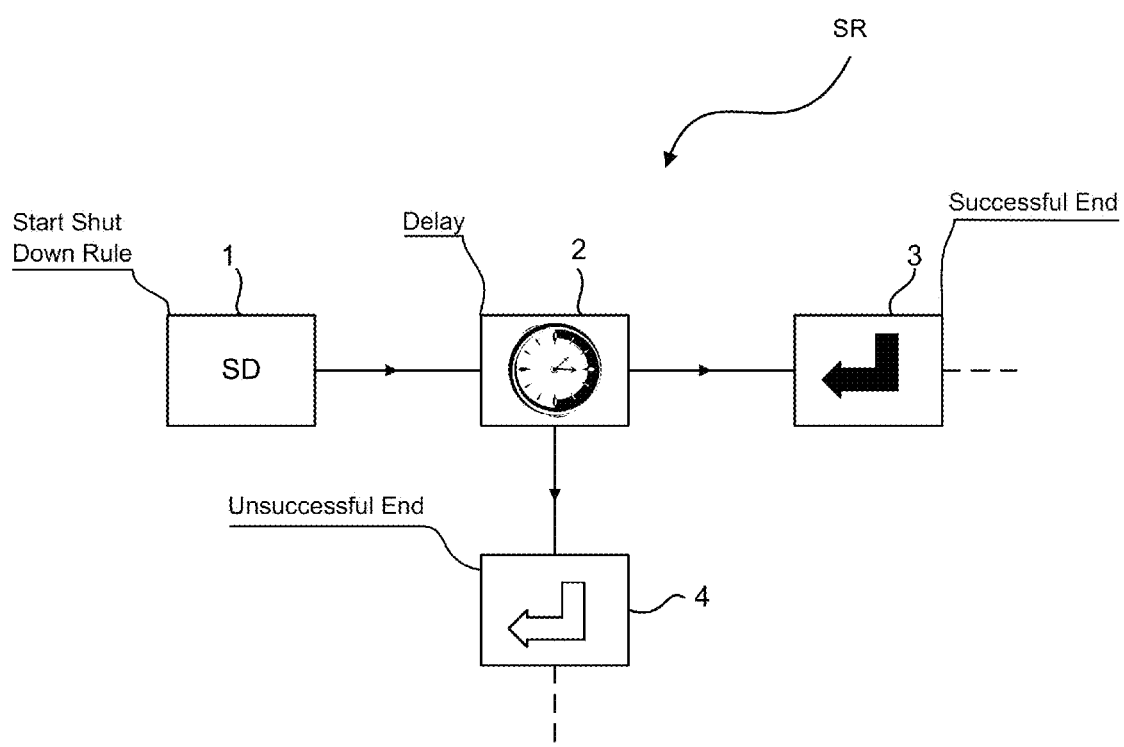

METHOD AND APPARATUS FOR CONTROLLING THE CLOSING OF A PLANT APPLICATION

CROSS-REFERENCE TO RELATED APPLICATION

This application claims the priority, under 35 U.S.C. §119, of European application EP 07 024 191.4, filed Dec. 13, 2007; the prior application is herewith incorporated by reference in its entirety.

BACKGROUND OF THE INVENTION

Field of the Invention

The present invention relates to a method and to a system for controlling the closing of a plant application running on a manufacturing execution system (MES) application. The MES application is in communication with an external environment through an application launcher and the MES application allows, at engineering time, to model a certain plant by creating objects belonging to classes in a plant application.

In the world of industrial automation of today, manufacturing companies, in order to improve their production capabilities and their competitiveness, make use of IT infrastructure for industrial control and automation.

Software products for industrial automation have increased, with time, in scope and refinement, in order to fit the large variety of requirements of manufacturing companies.

As defined by the Manufacturing Enterprise Solutions Association (MESA International), a Manufacturing Execution System (MES) "is a dynamic information system that drives effective execution of manufacturing operations", by managing "production operations from point of order release into manufacturing to point of product delivery into finished goods" and by providing "mission critical information about production activities to others across the organization and supply chain via bidirectional communication."

For example, the Siemens Corp. offers a broad range of MES products, under its SIMATIC® product family.

In manufacturing plants, a variety of configurations enable the implementation of flexible machine concepts which require in the backbone rather complicated and sophisticated software solutions in order to enable the approach of integrated automation.

As used herein, a software application is a set of software components, running on the computer system, developed by software developers to perform some useful actions within a MES system, e.g. monitoring values coming from plant process or controlling a plant device.

Typically, at engineering time, system engineers flexibly customize MES applications according to the specific manufacturing plant requirements. The MES application customization by system engineers is an important task in MES applications. In fact, software developers, at developing time, do not have the specific knowledge of specific plant requirement and thus develop a more general purpose MES application. It is then the subsequent task of system engineers to customize, at engineering time, the MES application to perform specific actions according the specific requirements of a specific manufacturing plant.

Instead, at runtime, MES applications are utilized by end-users who may be plant operators or line responsible personnel and who typically utilize the MES applications without performing any programming activity.

Sometimes, there exist an intermediate figure between the system engineer and the plant operator, typically denoted as plant engineer. Plant engineers receive the customizations performed by the system engineers, e.g. for a set of similar manufacturing plants, and they can do more specific customizations according to the specific manufacturing plant they manage.

Hardware and software failures are particularly critical in MES systems since such failures may lead to production interruptions or data loss which are very costly for manufacturing companies.

The most common used technique for dealing with MES system failures is to have at least two systems available, where one system is a running system, e.g. system A, and the other system is a backup system, e.g. system B.

In critical situations, for example when, due to software or hardware problems, a change/upgrade of the running application is requested, the application itself needs to be shut-down so that a new software version can be installed.

According to the prior art techniques, the following steps are typically performed:
a) manually switching of the running application on system A to the backup system B;
b) manually shutting down of system A;
c) upgrading of software application of system A in order to fix the problem;
d) manually switching back the running application from the backup system B to the system A;
e) manually shutting down system B; and
f) upgrading of software application on system B.

Thus, when a failure occurs, in order to switch the application from one system to the other, it is necessary to shut-down an often running application.

There are several techniques used to switch from one system to the other and the switching time varies accordingly.

For example, in case of a high-availability redundant hot-backup system, the switch over time is reduced to a minimum time. Instead, in case of cold back-up systems the switching time is usually much longer.

If the switching time is above a certain time threshold, not all running operations can be recovered correctly.

For example, if the application must react to incoming events, such incoming events have to be "saved" and maintained in a queue during the switching time.

If the switching time is too long compared with the events rate, such a queue may be overloaded, with several side effects such as, for example, data loss.

Thus, this technique has the drawback that several systems cannot be safely switched at any moment. In fact, the choice of the moment where the switch is possible is neither trivial nor a-priori detectable by a generic system.

This problem becomes more complex in MES systems that are customized for specific plant requirements, at engineering time, where business logics are inserted via ad-hoc tools or via an execution environment. For example, Distributed Control Systems (DCS) that are programmed via Sequential Function Language (SFC) charts according to user logics.

In such cases, when the execution environment needs to be switched, it is not known whether the closing procedure for performing the switch can be performed or not. Thus, the decision of when the closing procedure can take place is left to the end user, e.g. the plant operator who can take such a decision in the "wrong moment".

In fact, often, end-users do not have the complete knowledge of the system status and they can make mistakes in determining the time to perform a switch.

Thus, the used methods of controlling the closing/switching of MES systems have the drawback of been mistake prone being dependant on end-user decisions.

SUMMARY OF THE INVENTION

It is accordingly an object of the invention to provide a method and a system for controlling the closing of a plant application that overcomes the above-mentioned disadvantages of the prior art methods and devices of this general type, which safely reduces human mistakes.

The aforementioned aim is achieved by a method and a system for controlling the closing of a plant application running on a MES application. The MES application is in communication with an external environment through an application launcher and the MES application allows, at engineering time, to model a certain plant by creating objects belonging to classes in a plant application. The invention includes the steps of:

a) providing to a set of classes, a custom shutdown rule to be customized at engineering time;
b) at engineering time, defining, for certain classes belonging to the set of classes, certain shutdown rules (SR) with a set of actions to be performed by the MES application;
c) at run time, by the application launcher, upon receiving an external request of closing the plant application, notifying the closing request to the MES application;
d) at run time, by the MES application, invoking the shutdown rules once for each object of the classes of item b) which have a defined shutdown rule;
e) at run time, by the MES application, performing the actions defined in the invoked custom shutdown rules;
f) at run time, by the MES application, closing or not closing the plant application according to the results of the invoked shutdown rules of item e); and
h) at run time, by the MES application, notifying the PM launcher whether the plant application was closed at item f) or not.

The proposed invention allows programming once, at engineering time, the logic that checks if a shutdown of an application can be done, without the need of asking this, at run time, to plant operators.

Thus, the proposed invention, by allowing system engineers to customize the behaviour of a system during shutdown phases, prevents that critical operations are interrupted at wrong times.

The proposed invention allows control of MES systems in any situation in which an application closing is requested, providing a clear, easy and affordable way for system engineers to insert customer plant logic in a MES system.

Moreover, embodiments of the proposed invention allow that, in cluster managed systems, applications are switched between different machines, e.g. in cases of software upgrades, in the right moment, making it a practicable technique in applications where currently it is not.

Other features which are considered as characteristic for the invention are set forth in the appended claims.

Although the invention is illustrated and described herein as embodied in a method and a system for controlling the closing of a plant application, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block illustration of a message sequence diagram which schematically illustrates an example shutdown rule according to an example embodiment according to invention.

DETAILED DESCRIPTION OF THE INVENTION

According to embodiments of the invention, an application of a MES system, e.g. called a production modeler (PM), provides a development tool for system engineers, in order to model, at engineering time, industrial plants as well as the logic which organizes productive activities.

The MES application called PM application is an exemplary tool for MES applications developing taken from SIMATIC IT, the MES suite developed by Siemens. However, the proposed invention may be based on other types of MES application developing tools.

The PM application is conceived as a graphical object oriented tool. The object oriented approach of the PM advantageously allows software re-utilization by saving object templates, called PM classes, in libraries which can be added upon request.

A PM class includes the definition of some common properties to the objects belonging to the class. These properties include:

a) attributes: common characteristics of the class objects;
b) methods: common functionalities of the class objects;
c) events: common events that can be signaled by the class objects; and
d) rules: a set of action that can be graphically defined by system engineers and that can be associated to the defined classes. Rules can be seen as internal methods.

The graphical environment of the PM allows system engineers to build their applications in a graphical way by using a palette of predefined steps and connecting them in order to define a sequence of operations.

For example, in order to model the activities of a specific plant, the system engineer may define a class "reactor" and a class "report manager" by saving both classes in a library called "PMLIB".

The "reactor" class may have some methods defined by the system engineers such as "react", "fill", empty", "abort reaction". Such methods actually invoke actions on the programs controlling the reactor.

System engineer may graphically define a class specific logic to be executed by creating for the specific class a PM rule by combining predefined steps connected directly or indirectly to a root step.

Via a tool palette, the system engineer may define custom rules and it is up to him/her to specify when the custom rule is to be activated. For example, the system engineer may define an alarm rule for the "reactor class" to be activated upon receiving an alarm from an object belonging to the reactor class or to be activated by another rule.

According to the present invention, some or all of the PM classes are provided with a shutdown rule that is customizable at engineering time. The shutdown rule enables a controlled closing of the PM.

According to embodiments of the present invention, the system engineers, who actually have knowledge of the specific plant requirements, are performing the following steps:

a) defining, for certain PM classes, a shutdown rule to be assigned to these certain classes. For example, this step is performed by graphically selecting a given PM class and then by graphically selecting a new shutdown rule from the PM class menu, e.g. by clicking to the right mouse menu.

b) defining shutdown rule details by specifying actions to be performed. For example this step is performed by showing the shutdown rule entry point and by adding, configuring and connecting to the entry point steps taken from a graphical palette, as shown in the example of the FIGURE.

c) creating objects of these certain PM classes inside the plant model application. The plant model application is a user application, created using the PM, and which is composed of different classes defined by the user/system engineer. The plant application runs hosted by the PM application. For example, this step is performed first by creating or by going to a plant model application; second, if the plant application does not include the library where the class is defined, adding it; and third, creating in the plant application an object of the class, selecting from a palette.

The shutdown rules defined by the system engineers at step a) are organized in a class hierarchy in an automatic manner by the PM application which saves them in the appropriate data structure according to the PM class hierarchies. Advantageously, by having the shutdown rules assigned to classes, flexibility and specialization are obtained. Flexibility is obtained because the shutdown logic is invoked only if objects belonging to the specific class are used. Specialization is obtained because only logic specific to the specific class can be used (system engineers do not have to insert type checks like "if an object of class C is defined then . . . ").

At step C), once the first object is defined, PM checks if a shutdown rule is already existent for the class of the object. If not, such rule is created in the plant application. At this point, each logic specific to each object class is automatically created and organized.

Thus, at developing time, the PM application is extended so as to be able to define a palette from which a shutdown rule can be easily created, to be able to extend PM class data structure to represent shutdown rules and to be able to maintain organized shutdown rules, linking them to PM classes.

The FIGURE shows a block diagram of an example shutdown rule according to an example embodiment of the present invention.

The system engineer has chosen, via a step palette not shown, the steps to be performed by the shutdown rule SR. Block 1 denotes the start of the shutdown rule SR. Block 2 is a delay step. Blocks 3 and 4 are denoting the end of the rule, one successful, block 4, and one unsuccessful, block 3.

The execution of delay step 2 consists of pausing execution until one of the two following conditions happens:
a) the configured logical expression, evaluated continuously at a certain fixed rate, e.g. 2 seconds, returns TRUE; and
b) the configured timeout, e.g. 5 minutes, is reached.

If condition A happens block 3 is executed; if condition B happens while the logical expression still return FALSE, block 4 is executed.

In this example, the logical expression of delay step 2 has a meaning similar to the following logical condition: "not (there exists a PM rule that is an-active-execution-of do-report)".

The timeout of delay step 2 for this example is 5 minutes.

Block 3 represents a "successful end" step, which does not require further configurations; if block 3 is executed, the shutdown rule SR ends by returning an "ok to proceed" message to the PM and then in turn to the PM launcher.

Block 4 is a "not-successful end" step, which also does not require further configurations; if block 3 is executed, the rule ends returning a "not ok to proceed" message.

Advantageously, by using a graphical approach for building the shutdown rule logic, the "program algorithm" is simply visible to system engineers and it is self-documenting since it resembles a flow-chart, which is easy to understand, i.e. a set of software components having program algorithm for the shutdown rule logic executed by application engine. In fact, system engineers are advantageously able to understand overall logic without looking at deep details. Moreover, modifications of the rule logics are very easy and immediate.

The PM is in communication with the external environment through an application launcher, here denoted as PM launcher. The PM launcher is an intermediate layer between the PM and the external accesses.

The PM launcher defines a channel through which commands may be sent to the PM and through which feedbacks may be received from the PM.

At run time, a request to close the plant application may arrive from the external environment for a variety of reasons, e.g. request for upgrade, request for backup and so on.

The PM launcher intercepts the closing request coming from the external environment.

At developing time, the PM launcher is extended so as to be able to deal with shutdown requests, by receiving a shutdown request from the external environment and by passing it on to the PM as well as later passing back the feedback response.

The closing request may arrive from the external environment to the PM launcher automatically by a backup management system or manually when a plant operator requests the closing of the plant application through a dedicated GUI.

At run time, upon receiving an external closing request, the PM launcher notifies the PM application of the closing request. With such closing notification, a PM closing procedure is activated.

The PM closing procedure performs the following steps:
a) finding all the shutdown rules SR to activate;
b) executing the found shutdown rules SR (whose execution may or may not imply the closing of the plant application); and
c) giving back results to PM launcher (whether the plant application was successfully closed or not).

In embodiments of the present invention, the search for the shutdown rules SR to be activated in step a) is fast and easy since all the shutdown rules SR are previously stored in a pre-defined area.

Once the PM launcher is notified whether the plant application was closed or not, it sends an event acknowledge notification to the external environment, e.g. to the SCM or to the GUI of the plant operator.

With the proposed invention, at run time, the system engineers have a powerful tool for debugging and testing their inserted logic when requested by monitoring graphic execution of invoked shutdown rules SR, thus reducing the required testing time.

In an example embodiment of the present invention, it is described how a closing request is processed in a MES application whose plant application includes objects belonging to the "reactor" and "report manager" classes.

As shown in this example, the defined shutdown rules SR, when invoked, manages custom specific actions to be issued according to plant conditions or constraints.

As regards the "reactor" class, the class has a system attribute RESOURCE STATUS that can have two values BUSY or FREE. The PM itself sets the attribute RESOURCE-STATUS to BUSY when the object is used, i.e. when a method is running on it, FREE otherwise.

A system attribute is an attribute present by default in the class because it is defined in the PM itself and managed by the PM, without any need to specify additional code by the system engineers.

Let us assume that the reactor class has the constraint that when a reactor is doing a reaction, the controlling plant application cannot be closed.

According to the present invention, the system engineer, at engineering time, is easily enabled, by defining the actions of a shut down rule SR specific for the reactor class, to implement such a constraint.

For example, the shutdown rule of the reactor class may contain the following steps:
a) a condition step that checks if the RESOURCE-STATUS attribute of THE-PLANT-OBJECT, e.g. the reactor object, is FREE. The condition step is a step that can easily be dragged from the palette with two exits: TRUE and FALSE. At run time, the PM executes the action associated with any of the steps connected to the TRUE exit or to the FALSE exit according to the condition results;
b) a "ok to proceed" step, connected to the TRUE exit; and
c) a "not ok to proceed" step, connected to the FALSE exit.

Such steps do not need to be configured by system engineers; they actually terminate the rule, respectively with an "ok" and a "not ok" return. Such value is returned to PM application engine as the result of shutdown rule execution and then, by the PM launcher, returned to external application where shutdown was requested.

The shutdown rule is written by a system engineer and it is executed by the PM application engine.

As regards the "report manager" class, the class has a "collect data" method and a "do report" rule or method.

Let us assume that the "do report" rule activates "collect data" method for any object in the plant application and that it typically takes a lot to be completed (because data are very large)

Thus, the "report manager" class has a constraint: if the "do report" rule is running, wait for at most 5 minutes before closing application, giving it the possibility to finish the work and collect relevant data Also in this case, according to the present invention, the system engineer, at engineering time, is easily enabled, by defining the actions of a shut down rule SR specific for the report manager class, to implement such a constraint.

For example, the shutdown rule SR of the report manager class may contain the following steps:
a delay step, configured to have a timeout, e.g. of 5 minutes, and to have an expression to perform a continuous check, expressed by a sort of "natural language" similar to the following: "not (there exists a "do report" PM rule under execution)".
a) an "ok to proceed" step, connected to the TRUE exit; and
b) a "not ok to proceed" step, connected to the FALSE exit.

The FIGURE is a block diagram of the above described shut-down rule.

Let us assume that, at engineering time, a system engineer defines a plant application PMPLT that requires the library PMLIB and it is composed by different areas. In one of these areas, a reactor object REACT1 is defined and also a report manager component is defined that can be activated by logic defined by the system engineer named REPMGR.

Since both a reactor and a report manager exist, in the plant there are two shutdown rules SR, one for each class in which the shutdown rule SR is defined.

There is one shutdown rule SR for each class where system engineers have defined them, regardless of how objects of a class exist. In other terms, if two reactors REACT1, REACT2 are defined in the plant application, the reactor shutdown rule is unique.

Thus, in cases when more than one object of a class exists, the corresponding shutdown rule (that is unique) is invoked for each class object. For example, for the two reactors REACT1, REACT2, there is one shutdown rule that is invoked twice, one for each reactor. The invocation order is preferably following the plant hierarchy. For example, if the cell object C1 contains two objects units A1 and A2, and all three objects have shutdown rules SR assigned, the invocation order is the following: first the shutdown rule SR of cell object C1 and afterwards, in parallel, the shutdown rule of unit objects U1 and U2.

In general, the shutdown rules SR are collected automatically by the PM procedure called when the closing request arrives as it is described below.

When the operator requests an application shutdown, several different use cases may occur as exemplified below.

According to a first case, the closing request is successfully performed.

An example of this first case may include the following steps:
a) an external closing requests arrives to the PM launcher;
b) the PM launcher activates a PM closing procedure;
c) the PM launcher is notified that the closing requests is under process in the PM and it waits for acknowledge notification;
d) PM procedure finds two shutdown rules SR, one for the reactor object and one for the report manager object, and it activates them;
e) the two shutdown rules SR are executed;
f) both shutdown rules SR return TRUE;
g) the plant application is closed; and
h) acknowledge of the closing request is sent back to the PM launcher.

Another example of this first case may include the following steps:
a) an external closing requests arrives to the PM launcher;
b) the PM launcher activates a PM closing procedure;
c) the PM launcher is notified that the closing requests is under process in the PM and it waits for acknowledge notification;
d) PM procedure finds two shutdown rules SR, one for the reactor object and one for the report manager object, and it activates them;
e) the two shutdown rules SR are executed;
f) reactor shutdown rule SR returns TRUE;
g) manager report shutdown rule SR runs for a while;
h) report rule returns TRUE after 3 minutes;
i) the plant application is closed; and
j) acknowledge of the closing request is sent back to the PM launcher.

In a further embodiment of the present invention, the closing request may successfully be performed when there are no shutdown rules SR to be executed.

According to a second case, the closing request is refused.

An example of this second case may include the following steps:
a) an external closing requests arrives to the PM launcher;
b) the PM launcher activates a PM closing procedure;
c) the PM launcher is notified that the closing requests is under process in the PM and it waits for acknowledge notification;

d) PM procedure finds two shutdown rules SR, one for the reactor object and—one for the report manager object, and it activates them;
e) the two shutdown rules SR are executed;
f) reactor shutdown rule SR returns FALSE;
g) if manager report shutdown rule SR is running it is stopped; and
h) request refusal is sent back to the PM launcher.

Another example of this second case may include the following steps:
a) an external closing requests arrives to the PM launcher;
b) the PM launcher activates a PM closing procedure;
c) the PM launcher is notified that the closing requests is under process in the PM and it waits for acknowledge notification;
d) PM procedure finds two shutdown rules SR, one for the reactor object and—one for the report manager object, and it activates them;
e) the two shutdown rules SR are executed;
f) reactor shutdown rule SR returns TRUE;
g) manager report shutdown rule SR runs until delay timeouts expires;
h) report rule returns FALSE after 3 minutes; and
i) request refusal is sent back to the PM launcher.

Advantageously, with embodiments of the present invention, system engineers are easily enable to specify in a graphical manner conditions to checked and/or actions to be performed upon closing request, while the PM system is automatically taking care whether to perform rejecting/acknowledging commands.

Examples of the specified actions may include:
a) accepting a closing request after having performed a check;
b) waiting until a critical action is ended before accepting the closing request;
c) refusing a closing request during critical processes; and
d) managing timeout using extended logic, which can take care of run time conditions.

Thus, if some specific actions are required to be performed at closing request, the system engineers are easily enabled to specify them, for example, it can be defined to collect data for report just before closing the plant application. The resulting rule is simply having a PM rule caller step, with the name of the rule to call, e.g. "do report" in this case.

Another example may be that a logic belonging to an important, e.g.: safety category is running and it is required that such logic is not interrupted. As a result, the system engineers can place in the shutdown rule SR in a general object a query finding the number of safety logics that are running and thus prevents that a closing request is accepting in this situation. The general object represents the topmost object, e.g. the site of representing the overall plant as defined by ISA 95, the international standard for the integration of enterprise and control systems.

Preferably, defined shutdown rules SR are saved in libraries. In such a way, the system engineers that have defined them may be different than the engineers who actually manage the specific plant logic, e.g. the plant engineers. Plant engineers are thus able to override shutdown rules logic, changing the copies created in the plant application.

In further embodiments of the present invention, it may preferably exist a backup management system able to switch on and off the plant application for backup/upgrading purposes. Such backup management system may be based, for example, on Microsoft Cluster Server.

For example, the decision about switching on/off applications for backup/upgrading purposes is made manually by an end-user, e.g. plant operator, and entered using a GUI that interfaces the backup management system and the PM application.

The PM launcher, which acts as intermediate layer between the PM and the backup management system, is receiving the closing request when the end-user requests the switching off the plant application.

The PM launcher is also notifying the backup management system and the GUI whether the closing request has been successfully performed or has been refused.

Until the PM launcher acknowledges or notifies the refusal of the closing request, the backup management system is in a transient state. From this transient state, for example after a configurable timeout, the backup system may go into a "refused" state. This does not cause system instability because the logic executed by the shutdown rule SR is prior to switch command execution, and it does not imply any "closing action".

The invention claimed is:
1. A method for controlling a closing of a plant application running on a manufacturing execution system (MES) application running on a computer system, the MES application is in communication with an external environment through an application launcher and the MES application allows, at engineering time, to model a certain plant by creating objects belonging to classes in a plant application, comprising: providing a production modeler (PM) tool, wherein the PM tool advantageously allows software to reutilize PM classes, wherein the PM classes saving in PM libraries which are added upon request, wherein the PM classes having properties including attributes, methods, events, and rules;
   a) providing to a set of the classes, shutdown rules to be customized during the engineering time, wherein the shutdown rules enable a controlled closing of the plant application;
   b) defining, at the engineering time, for certain classes belonging to the set of classes, certain of the shutdown rules with a set of actions to be performed by the MES application, wherein the set of actions is graphical defined and displayed and associated to the certain classes and the shutdown rules to be assigned to the certain classes, the shutdown rules customizing a behavior of the objects forming the certain classes in view of critical operations being interrupted at wrong times and determining if the closing of the plant application is permissible without manual intervention;
   c) notifying a closing request to the MES application by the application launcher at run time, upon receiving an external request for closing the plant application, wherein the MES application communicating with the external environment through the application launcher;
   d) invoking the shutdown rules once for each object of the classes of step b) which have a defined shutdown rule by the MES application at run time;
   e) performing the actions by the MES application defined in the shutdown rules invoked at run time;
   f) closing or not close the plant application by the MES application at run time, according to results of the shutdown rules invoked in step e);
   g) notifying a production modeler launcher by the MES application at run time whether the plant application was closed at step f) or not;
   wherein the PM allows system engineers to build their applications using predefined steps and connecting them in order to define a sequence of operations;

wherein the shutdown rules are created to extend PM class data structure to represent shutdown rules and to maintain organized shutdown rules;

wherein shutdown logic is invoked only if objects belonging to specific class are used; and wherein when invoked, manages custom specific actions to be issued according to plant conditions or constraints.

2. The method according to claim 1, wherein the request of closing the plant application at step c) arrives at the application launcher from a backup management system and wherein, after step g) the application launcher notifies the backup management system whether the plant application was closed at step f) or not.

3. A computer system for controlling a closing of a plant application running on a manufacturing execution system (MES) application, the MES application is in communication with an external environment through an application launcher and the MES application allows, at engineering time, to model a certain plant by creating objects belonging to classes in a plant application, comprising: a computer running a software application and a set of components, the set of components having a program algorithm for a shutdown rule logic executed by an application engine, said computer programmed to: providing a production modeler (PM) tool, wherein the PM tool advantageously allows software to reutilize PM classes, wherein the PM classes saving in PM libraries which are added upon request, wherein the PM classes having properties including attributes, methods, events, and rules;

a) provide to a set of the classes, shutdown rules to be customized during the engineering time, wherein the shutdown rules enable a controlled closing of the plant application;

b) define, at the engineering time, for certain classes belonging to the set of classes, certain of the shutdown rules with a set of actions to be performed by the MES application, wherein the set of actions is graphical defined and displayed and associated to the certain classes and a the shutdown rules to be assigned to the certain classes, the shutdown rules customizing a behavior of the objects forming the certain classes in view of critical operations being interrupted at wrong times and determining if the closing of the plant application is permissible without manual intervention;

c) notify a closing request to the MES application by the application launcher at run time, upon receiving an external request for closing the plant application, wherein the MES application communicates with the external environment through the application launcher;

d) invoke the shutdown rules once for each object of the classes of step b) which have a defined shutdown rule by the MES application at run time;

e) perform the actions by the MES application defined in the shutdown rules invoked at run time;

f) close or not close the plant application by the MES application at run time, according to results of the shutdown rules invoked in step e);

g) notify a production modeler launcher by the MES application at run time whether the plant application was closed at step f) or not;

wherein the PM allows system engineers to build their applications using predefined steps and connecting them in order to define a sequence of operations;

wherein the shutdown rules are created to extend PM class data structure to represent shutdown rules and to maintain organized shutdown rules;

wherein shutdown logic is invoked only if objects belonging to specific class are used; and wherein when invoked, manages custom specific actions to be issued according to plant conditions or constraints.

* * * * *